Jan. 2, 1962  R. J. ROSA  3,015,250

SPECTROGRAPH

Filed Nov. 24, 1958

INVENTOR.
RICHARD J. ROSA
BY
Louis B. Applebaum
ATTORNEY

United States Patent Office 3,015,250
Patented Jan. 2, 1962

3,015,250
SPECTROGRAPH
Richard J. Rosa, Reading, Mass., assignor, by mesne assignments, to the United States of America as represented by the Secretary of the Navy
Filed Nov. 24, 1958, Ser. No. 776,157
5 Claims. (Cl. 88—14)

This invention relates to spectrographic devices and especially to a spectrographic device capable of recording the radiation from a luminous object which is moving at a very high speed.

The investigation of the properties of shock waves in a gaseous medium is a very important area of study especially in relation to the field of supersonic flight, as well as other fields. Shock waves have, therefore, been produced under laboratory conditions for the purpose of such study.

It has been discovered that shock waves produce luminous radiation, the intensity and spectral distribution of which is a function of the constitution and state of the gaseous medium in which the shock wave is propagated. Spectral photographs or spectrograms of the luminous radiation provide a means for investigating the properties of the shock waves.

In the past, it has been difficult to photograph shock waves by means of luminous radiation emitted therefrom because the speed at which shock waves travel does not permit sufficient time for a proper exposure. The present invention provides adequate exposure for shock wave radiation by moving the film on which the spectrograph is recorded in substantial time synchronism with the moving shock wave.

A typical embodiment of the present invention comprises a transparent shock wave tube, a slit-bearing member disposed adjacent to the tube with the slit running parallel to the longitudinal axis of the tube, a prism or grating with its plane of dispersion normal to the shock tube and a drum camera arranged so that its film motion is parallel to the image of the slit. When a shock wave travels along the tube, the drum revolves at an angular velocity such that the speed of the film and the speed of the shock wave are substantially the same.

An object of the present invention is to obtain spectrograms from rapidly moving, luminous objects.

Another object is to increase the photographic exposure time of rapidly moving, luminous objects, such as shock waves in gaseous media, so that properly exposed spectrograms may be obtained.

A further object is to effectively stop the movement of a shock wave so that spectrograms having good resolution of detail may be obtained.

Figure 2:
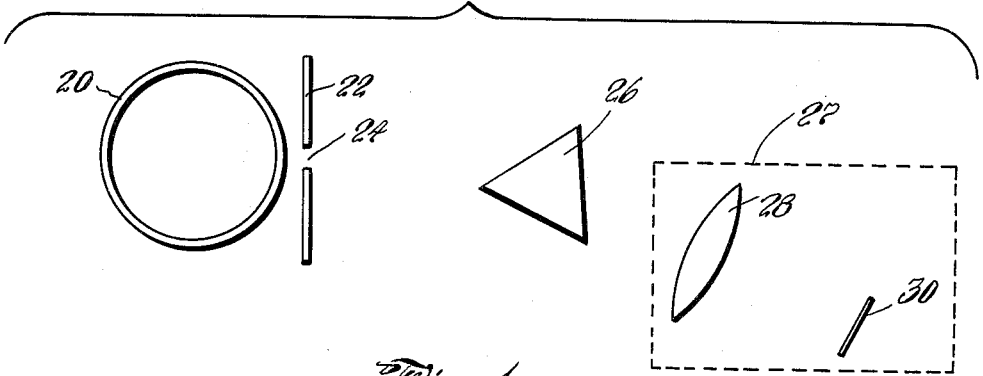
Figure 1:
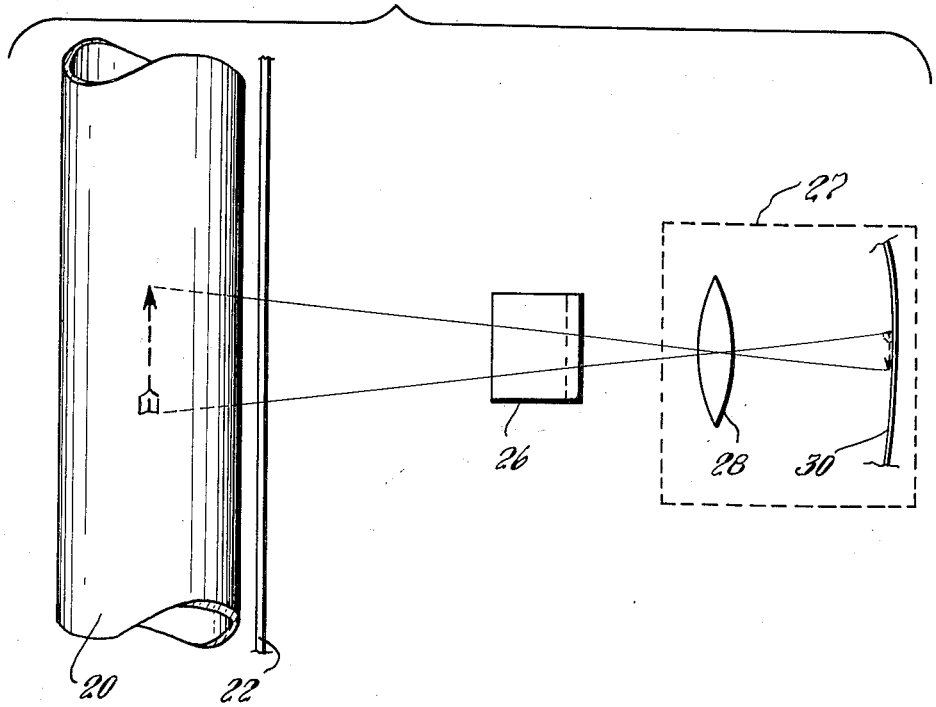

Other objects and many of the attendant advantages of this invention will be readily appreciated as the same becomes better understood by reference to the following detailed description when considered in connection with the accompanying drawings wherein:

FIG. 1 is a diagrammatic representation of an embodiment of the invention in elevational view; and FIG. 2 is a plan view of the embodiment shown in FIG. 1.

FIG. 1 shows a longitudinal translucent shock tube 20 alongside of which is disposed a slit-bearing member 22 which may, for example, be a metallic slat or board containing a long straight slit 24 therein. The slit-bearing member 22 is positioned so that the slit 24 runs parallel to the length of the tube 20.

A light-dispersing means such as a prism 26, or a diffraction grating, is placed at a suitable distance from the shock tube 20. A drum camera 27 schematically illustrated by lens 28 and drum 30, is placed near the prism 26 so that light coming from the shock tube 20 through the slit 24 is directed by the prism 26 through the camera lens 28 onto photographic film (not shown) carried on the drum 30.

The drum 30 is arranged so that the motion of the film is parallel to the length of the slit 24. The film motion is opposite to the motion of the shock wave in the tube 20, the direction of motion of the film and shock wave being indicated by the direction in which the small and large arrows are pointing in FIG. 1.

The speed at which the film moves should be equal to that at which the shock wave moves. If perfect synchronization is obtained between the speed of the film and that of the image of the shock wave, a "still" picture of the shock wave is obtained. Compared to a conventional drum camera spectrogram, an increase in exposure and resolution of light coming from different regions behind the shock front is obtained.

FIG. 2 shows, in plan view, the spatial relations of the shock tube 20, the board 22 and slit 24, the prism 26 and the drum camera 27.

It is possible also to dispense with a separate slitted board 22 by making the shock tube 20 opaque (for example, with paint) except for a thin slit-like section which would remain translucent.

Obviously many modifications and variations of the present invention are possible in the light of the above teachings. It is therefore to be understood that within the scope of the appended claims the invention may be practiced otherwise than as specifically described.

I claim:

1. A spectrographic instrument for obtaining a spectrogram of a rapidly moving, luminous object comprising, in combination: slit means through which light from said luminous object propagates; light-dispersing means in the path of the light from said slit means for spectrally dispersing said light; means for focusing said dispersed light into an image; and film-bearing means disposing a photographic film at the image plane of said focusing means, said film-bearing means being arranged to move said film at substantially the same speed as the movement of said image parallel to the direction of travel of said image, said image being maintained upon the same area of said film for the duration of the exposure time.

2. A spectrographic instrument for obtaining a spectrogram of a rapidly moving, luminous object comprising, in combination: slit means through which light from said luminous object propagates; light-dispersing means in the path of the light from said slit means for spectrally dispersing said light; and a drum-camera including lens means for forming an image of said dispersed light and a rotatable drum for carrying a photographic film upon which said image may be recorded, said drum being arranged to move said film in the same direction as and at substantially the same speed as the movement of said image, said image being maintained upon the same area of said film for the duration of the exposure time.

3. A spectrographic instrument for obtaining a spectrogram of a rapidly moving, luminous object comprising, in combination: slit means through which light from said luminous object propagates; light-dispersing means in the path of the light from said slit means for spectrally dispersing said light; and camera means including lens means for forming an image of said dispersed light and a rotatable drum for carying a photographic film upon which said image may be recorded, said drum being arranged to move said film in the same direction as and at substantially the same speed as the movement of said image, said image being maintained upon the same area of said film for the duration of the exposure time.

4. A spectrographic instrument for obtaining a spectrogram of a shock wave comprising in combination: shock wave tube means formed with a longitudinally extending, slit-like, translucent area through which light may be transmitted; light-dispersing means in the path of light transmitted through said translucent area for spectrally dispersing said transmitted light; and a drum camera including lens means for forming an image of said dispersed light and a rotatable drum for carrying a photographic film upon which said image may be recorded, said drum being arranged to move said film in the same direction as and at substantially the same speed as the movement of said image, said image being maintained upon the same area of said film for the duration of the exposure time.

5. A spectrographic instrument for obtaining a spectrogram of a shock wave comprising, in combination: a shock wave tube which is translucent at least along part of its length; means formed with a slit therein disposed alongside of said shock wave tube so that said slit extends parallel to said translucent part; light-dispersing means in the patch of light emanated from said tube and propagated through said slit for spectrally dispersing said propagated light; and a drum camera including lens means for forming an image of said dispersed light and a rotatable drum for carrying a photographic film upon which said image may be recorded, said drum being arranged to move said film in the same direction as and at substantially the same speed as the movement of said image, said image being maintained upon the same area of said film for the duration of the exposure time.

References Cited in the file of this patent

UNITED STATES PATENTS

| | | |
|---|---|---|
| 2,413,349 | Hancock et al. | Dec. 31, 1946 |
| 2,831,391 | Culver | Apr. 22, 1958 |
| 2,853,918 | Yoler | Sept. 30, 1958 |
| 2,930,280 | Grant | Mar. 29, 1960 |

OTHER REFERENCES

"A Special Camera for Photographing Cylindrical Surfaces," Davis, Scientific Papers of the Bureau of Standards, No. 517, vol. 20, Dec. 5, 1925, pages 515–516 relied upon.

"The Shock Tube Works for Research," article in Industrial Laboratories, February 1958, pages 6–9.